United States Patent [19]

Liu

[11] Patent Number: 5,662,113
[45] Date of Patent: Sep. 2, 1997

[54] EDGE ENHANCEMENT SYSTEM FOR ULTRASOUND IMAGES

[75] Inventor: Dong-Chyuan Liu, Mercer Island, Wash.

[73] Assignee: Siemens Medical Systems, Inc, Iselin, N.J.

[21] Appl. No.: 496,992

[22] Filed: Jun. 30, 1995

[51] Int. Cl.$^6$ .............................. A61B 8/00; G06K 9/00
[52] U.S. Cl. ....................................... 128/660.07; 382/128
[58] Field of Search .................. 128/660.01, 660.07, 128/661.1, 696; 382/128, 168, 172

[56] References Cited

U.S. PATENT DOCUMENTS

| | | | |
|---|---|---|---|
| 5,148,809 | 9/1992 | Biegeleisen-Knight et al. | 128/660.07 |
| 5,339,815 | 8/1994 | Liu et al. | 128/660.01 |
| 5,457,754 | 10/1995 | Han et al. | 382/266 X |

OTHER PUBLICATIONS

Crook, I et al "A Novel Algorithm for Edge Detection and Edge Enhancement of Medical Images", Med. Phys. 20(4) Jul./Aug. 1993 pp. 993–998.

Hwang, Humor et al "Multilevel NL Filters for Edge Detection & Noise Suppression", IEEE Sig Proc. Trans. V24 #2 Feb. 1994 pp. 249–258.

*Primary Examiner*—Francis Jaworski

[57] ABSTRACT

A method for enhancing an ultrasound image. The image is assumed to be in the form of an ordered array of pixels. Each pixel corresponding to the intensity of the echo generated by a corresponding voxel in an ultrasound energy field. Axial and lateral directions relative to the ultrasound beam used to generate the sound field are defined within the ordered array. The method of the present invention includes the steps of dividing the image into a plurality of processing blocks, picking blocks that satisfy certain statistical constraints for edge enhancement, enhancing the pixels in the selected blocks, and then displaying the pixels in each block, whether enhanced or not, that are above a display threshold for the block in question. The statistical constraints are determined by second order statistics with reference to the axial and later directions. In one embodiment of the present invention, sum and difference histograms are used to approximate the second order statistics, thereby reducing the computational load.

9 Claims, 1 Drawing Sheet

EDGE ENHANCEMENT SYSTEM FOR ULTRASOUND IMAGES

FIELD OF THE INVENTION

The present invention relates to ultrasound imaging systems, and more particularly, to a method for using a digital computer to enhance edges in ultrasound images.

BACKGROUND OF THE INVENTION

Medical ultrasound images are typically produced by generating an ultrasonic sound wave traveling in a known direction and observing the echoes created when the sound wave bounces off of boundaries between regions of differing density in the body. For any given direction, the image pixels are generated by plotting a dot whose brightness is proportional to the echo's amplitude at coordinate whose location is a function of the time the echo is received after a short pulse is send in the direction being measured. The process is repeated in different directions, thereby generating a two-dimensional image in which each point corresponds to the sound reflectivity of a different voxel in the patient's body.

Ultrasound images typically include a significant amount of speckling which appears as random noise. This background makes the detection and enhancement of edges of organs and vessel boundaries difficult. Classical edge detection/enhancement techniques such as fixed size gradient operators or the Laplacian of a Gaussan operator are poorly suited to ultrasound images since these techniques also enhance the speckles and tend to widen the detected edges and speckles.

Prior art edge enhancement methods for real-time applications rely on first-order statistics, namely the intensity histogram, to determine the boundaries of edges. Unfortunately, the properties of edges that are most effective in detecting edges require second-order statistics. Second-order statistics place a high computational load on the data processing system, and hence, have not been used for real-time applications.

Broadly, it is the object of the present invention to provide an improved ultrasound imaging system.

It is a further object of the present invention to provide an ultrasound imaging system with improved edge enhancement while not substantially enhancing speckling or widening the edges processed.

It is yet another object of the present invention to provide an ultrasound imaging system in which the edge enhancement computations are within the computational capability of the computer systems normally included in commercial ultrasound imaging equipment.

These and other objects of the present invention will become apparent to those skilled in the art from the following detailed description of the invention and the accompanying drawings.

SUMMARY OF THE INVENTION

The present invention is a method for enhancing an ultrasound image. The image is assumed to be in the form of an ordered array of pixels. Each pixel corresponding to the intensity of the echo generated by a corresponding voxel in an ultrasound energy field. Axial and lateral directions relative to the ultrasound beam used to generate the sound field are defined within the ordered array. The method of the present invention includes the steps of dividing the image into a plurality of processing blocks, picking blocks that satisfy certain statistical constraints for edge enhancement, enhancing the pixels in the selected blocks, and then displaying the pixels in each block, whether enhanced or not, that are above a display threshold for the block in question. The statistical constraints are determined by second order statistics with reference to the axial and lateral directions. In one embodiment of the present invention, sum and difference histograms are used to approximate the second order statistics, thereby reducing the computational load. In one embodiment of the present invention, a class of sigmoidal functions is used to remap the pixel intensities in the enhancement process.

DETAILED DESCRIPTION OF THE INVENTION

Figure 1:
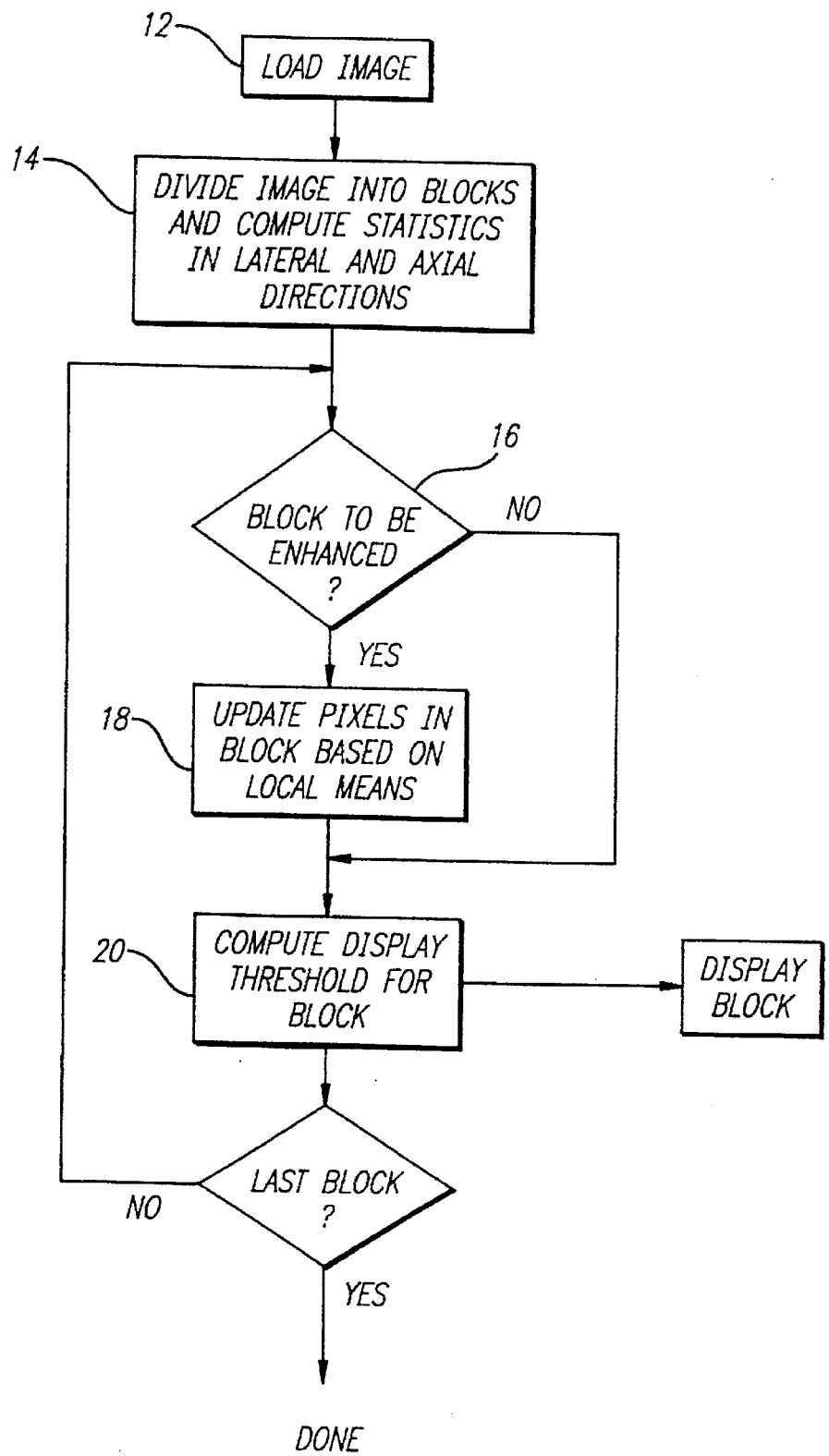
FIG. 1 is a flow chart for the preferred embodiment of the present invention.

The present invention utilizes a two step approach to edge enhancement. First, the image is segmented into processing blocks that include edges to be enhanced. The pixels of blocks having edges are then transformed via a sigmoidal transformation to enhance the edges. The sigmoidal function reduces the intensity of all pixels whose starting intensity is below the turning point of the transformation and increases the intensity of all pixels whose starting intensity is above the turning point of the transformation.

To avoid enhancing blocks that do not contain edges, each block is examined statistically to determine if the block is likely to have an edge that should be enhanced. Blocks that contain only speckles or reverberation artifacts are not processed by the edge enhancement part of the algorithm. Blocks that contain strong edges or weak boarders, as defined below, are enhanced.

The selection of blocks to be processed in the preferred embodiment of the present invention utilizes an approximation to the classical second-order statistics and a set of rules based thereon to identify the blocks having edges. If sufficient computational power is available, the second-order statistics in terms of the co-occurence matrix may be used instead of the approximation discussed below. Hence, the statistical measures utilized will be discussed both in terms of the co-occurence matrix and the sum and difference histograms utilized in the approximation used in the preferred embodiment of the present invention. The spatial gray-level co-occurrence matrix for a direction defined by the relative positions (k,j) and (k+Δx, j+Δy) in an array $I_{k,j}$ is given by $$C(i, j, \Delta x, \Delta y) = \frac{1}{N} \operatorname{Card}\{(k,l) | I_{k,l} = i, I_{k+\Delta x, l+\Delta y} = j\} \quad (1)$$

$$N = \sum_{i=0}^{N_r} \sum_{j=0}^{N_r} C(i, j, \Delta x, \Delta y)$$

where Card refers to the number of pixels for which the intensity of the pixel at (k,λ) has intensity i and the pixel displaced from that pixel by (Δx, Δy) has intensity j. Here, $N_r$ is the number of gray levels with which the image is quantized.

Similar information can be obtained at significantly less computational cost by using sum and difference histograms. It can be shown that the sum and difference of two random variables define the principal axes of the second order probability function of a stationary process. Further, for two independent and uncorrelated random variables, the joint probability function can be computed from the product of the probability function of the sum and difference variables. This observation allows the usual co-occurrence matrices to be approximated by their associated sum and difference histograms which can be estimated directly from the image. The error in this approximation is related to the degree to which the hypothesis of independence is satisfied. The sum and difference histograms, denoted respectively by $P_s$ and $P_d$, are defined as follows:

$$P_s(i, \Delta x, \Delta y) = \frac{1}{N} \text{Card}\{(k, l) | I_{k,l} + I_{k+\Delta x, l+\Delta y} = i\} \quad (2)$$

$$P_d(i, \Delta x, \Delta y) = \frac{1}{N} \text{Card}\{(k, l) | I_{k,l} - I_{k+\Delta x, l+\Delta y} = i\}$$

$$M = \sum_i P_s(i, \Delta x, \Delta y) = \sum_i P_d(i, \Delta x, \Delta y)$$

The features used to characterize blocks of the image may be written in terms of the co-occurrence or sum and difference histogram approximations. These features will be referred to as "texture parameters" in the following discussion. The texture parameters of interest in the preferred embodiment of the present invention are summarized in Table I below.

| Texture parameter | Co-occurrence matrix computation | Sum and difference histogram computation |
| --- | --- | --- |
| mean | $\sum_i \sum_j i C(i,j) = \mu$ | $\frac{1}{2} \sum_i i P_s(i) \equiv \mu$ |
| variance | $\sum_i \sum_j (i-\mu)^2 C(i,j)$ | $\frac{1}{2} \left( \sum_i (1-2\mu)^2 P_s(i) + \sum_j j^2 P_d(j) \right)$ |
| correlation | $\sum_i \sum_j (i-\mu)(j-\mu) C(i,j)$ | $\frac{1}{2} \left( \sum_i (1-2\mu)^2 P_s(i) - \sum_j j^2 P_d(j) \right)$ |

The preferred embodiment of the present invention uses these statistical measures in the axial direction, i.e., along the ultrasound beam, and the lateral direction, i.e., at right angles to the beam direction. A block may be classified as having first-order reverberation effects, strong edges, and weak borders based on the texture parameters.

The classification is carried out by first dividing the image into processing blocks, each with the dimension of m x n pixels. In each block, the texture parameters described above are computed for the axial and lateral directions. It should be noted that the texture parameters described above are depend on the displacement direction specified by ($\Delta x$, $\Delta y$). Hence, the "mean" corresponding to the direction dependent co-occurrence matrix is not the same as the mean from the local amplitude distribution as normally defined. The values obtained for the texture parameters are quantized such that decisions are based on ranges of values, referred to as Small, Medium, and Large in the following discussion. The small range is further divided into two ranges, the smaller of which being denoted by Very Small.

The quantization is performed separately for the three texture parameters and each column of processing blocks. That is, the range of values for each texture parameter is computed for all of the processing blocks in a given column. The values in that column are then quantized into the three values for that texture parameter in the column. The process is repeated for each column. This procedure has the advantage of providing a self-calibration of the texture parameters. If the observed range of values for any texture parameter in any column is too small, the division of the small range into Small and Very Small may be omitted, i.e., only the Small level is used. Similarly, the classification of Large can be omitted if the range is too small. This situation arises when the blocks in the column all contain speckles or other uninteresting features.

A block is defined to be a "first-order reverberation" block if the previous block in the axial direction had a mean, variance, and correlation parameters that were all Large and the current block has mean, variance, and correlation parameters that are all Medium. This reflects the observation that strong reflectors perpendicular to the scan beam generate reverberation artifacts which appear as edges just beneath the strong reflector. The reverberation edges appear to be similarly situated boundaries posterior to the actual reflector. However, these boundaries are less pronounced that the echoes from the real boundary.

A block is defined to be a "strong edge" if the mean is at least Medium and the variance and correlation are Large in either the axial or lateral direction.

A block is defined to be a "weak border" if any of the following conditions is satisfied in either the axial or lateral directions. First, the difference in variance and correlation between the previous block and the current block is at least Medium. Here, the blocks are ordered along the scan direction, the previous block being that corresponding to the image area nearest the ultrasound transducer. Second, the difference in the variance and correlation of the current block and the next blocks is at least Medium. Third, the correlation of the current block is greater than Vary Small, and the mean, variance, correlation of the previous block is Very Small. Finally, the correlation of the current block is greater than Very Small, and the mean, variance, and correlation of the next block is Vary Small.

In the preferred embodiment of the present invention, blocks defined as having a strong edge or a weak border are enhanced using the edge enhancement algorithm described below. As noted above, this decision is based on the texture features computed for a specific direction. While strong reverberations are only found in the axial direction, strong edges and weak boarders may have any orientation. Hence, in the preferred embodiment of the present invention, the texture features are computed for both the axial and lateral directions.

Before a block is chosen for edge enhancement, the preferred embodiment of the present invention adjusts the intensity of all of the pixels in the block to take into account the drop in intensity arising from the distance between the corresponding physical features and the ultrasound transducer. Objects that are farther from the transducer return smaller intensity echoes due to the dispersion of the ultrasound beam and the smaller solid angle subtended by the transducer for these more distant reflectors. Hence, blocks that are far from the transducer need to be increased in gain relative to those that are near the transducer. In the present invention, this is accomplished by applying a scaling factor to each block in an axial direction to correct for these distance effects.

The scaling factor applied depends on the measured texture parameters as described above and the mean intensities of the blocks on the particular axial path. For the $i^{th}$ block, the scaling factor applied to the pixels is $g\bar{\mu}/\mu_i$, where $\mu_i$ is the mean of the block as computed above in the axial direction and $\bar{\mu}$ is the average of the $\mu_i$. The factor g depends on the texture parameters. If the mean and correlation are Very Small then g<1, typically 0.6. Such a block is typical of an area of fluid or a cyst. If the mean and correlation are Large, g=1 to preserve the strongly reflecting feature in the block.

The scaling factors computed above are assumed to apply at the center of each block. To avoid introducing a "blocking" artifact into the image, the actual scaling is computed for each pixel by linearly interpolating the scaling factors computed above and using the pixel's distance from the transducer.

For blocks that are to be processed through the edge enhancement algorithm, the enhancement of the edges is carried out for each pixel in the block as follows: First, a small processing window, typically 5×5 pixels, is defined around the pixel to be altered and the mean of the intensity values of the pixels in the window is determined. In the preferred embodiment of the present invention, the mean value is used to select a sigmoidal-shaped transformation whose turning point is at the measured mean and which maps a pixel intensity of 0 to 0 and a pixel intensity of $N_r$ to $N_r$, where $N_r$ is the maximum allowed pixel intensity. Other pixel intensity values are mapped such that values below the mean decrease in amplitude, and those above the mean increase in amplitude. Finally, the transformation curve is monatomic. These conditions assure that no pixel value will be altered such that it is out of bounds and that pixel values are not altered such that a first pixel that was less than a second pixel before enhancement is assigned a pixel intensity that is greater than that assigned to the second pixel after enhancement. It should be noted that the requirement that 0 be mapped to 0 and $N_r$ be mapped to $N_r$ are not necessary for the invention to function properly.

The preferred sigmoidal curve is generated by using a conventional sigmoid function whose turning point is at the mean of the intensities in the 5×5 window. Sigmoidal functions are functions of the form $$y(x) = \frac{N_r}{1+e^{(m-x)/a}} + m - \frac{N_r}{2} \quad (3)$$

Here, x is the original pixel intensity and y(x) is the new pixel intensity. The parameter m is the "turning point" of the curve. Such a curve does not alter the values pixels whose intensities are at the turning point. As stated in Eq. (3), the curve does not satisfy the constraint of mapping 0 to 0 or $N_r$ to $N_r$. Hence, the preferred embodiment of the present invention uses a curve which is sigmoidal at the mean of the intensities but is altered at one or both ends to provide the desired behavior for pixels that are either much lower than the mean or much higher. If the curve maps 0 to a value above 0 or $N_r$ to value below $N_r$, the curve is replaced by a straight line tangent to the curve and passing through ($N_r, N_r$) if the condition created a pixel with intensity less than $N_r$ for an x=Nr. The replacement starts at the intensity value at which the point of tangency occurs. If the sigmoid fails to map an intensity of 0 to 0, the same strategy is applied, except that the tangent line connects (0,0) to the point of tangency below the turning point, and the portion of the sigmoid from 0 to the point of tangency is replaced by the straight line.

If the mapping curve goes out of bounds, i.e., an $x=N_r$ is mapped to a new pixel intensity greater than $N_r$ or an x=0 is mapped to a negative pixel intensity, the basic sigmoidal curve is altered so that it remains sigmoidal near the turning point but is smoothly compressed between the turning point and the end point that was out of bounds. In the preferred embodiment of the present invention, the pixel transformation curves for each possible mean value are stored in digital form such that the enhancement transformation may be carried out by a simple table look-up operation. In principle, one such table can be stored for each value of the parameter "a" in Eq. (3). This parameter determines the degree of enhancement provided by the sigmoidal mapping. However, to save memory, the preferred embodiment of the present invention stores a table for only the smallest value of "a". If additional enhancement is needed, the transformation is iterated to provide the additional enhancement.

As noted above, edge enhancement tends to broaden edges. To reduce any such broadening, the pixels of the processing blocks, whether enhanced or not, are only displayed to the viewer if the pixel intensity is above a "display threshold". The display threshold is computed for the entire block by selecting the a level which determines whether or not a pixel is actually displayed to the user. Pixels with intensities below this level are not displayed. The level may be selected with reference to the intregal of the intensity over the block or the intregal of the intensity squared, e.g. the power in the image in the block. In the preferred embodiment of the present invention, the level is set such that a predetermined fraction of the power or intensity intregal is not displayed.

The above described algorithm may be most easily summarized with respect to FIG. 1 which is a flow chart of the preferred embodiment of an image enhancement according to the present invention. The image is loaded into the memory of the micro-processor or other computer as shown at 12. The image is divided into processing blocks and the texture parameters computed for each block in the axial and lateral directions as shown at 14. The computed texture parameters are then quantized and normalized by column. Each block is examined according to the decision rules to determine if the block is to be subjected to edge enhancement as shown at 16. Those blocks that are to be subjected to edge enhancement are processed by transforming the intensity of each pixel in the block using a transformation curve that depends on the mean of the pixels surrounding the pixel in question as shown at 18. A display threshold is then computed for each block and the pixels having intensity values above the display threshold are displayed on a CRT screen or in some other human perceivable form as shown at 20.

As noted above, the preferred embodiment of the present invention also corrects the pixels for intensity variations that depend on the distance from the corresponding voxel in the body being imaged to the transducer. When such additional corrections are included, they are incorporated at the image blocking step 14 prior to computing the texture parameters.

The preferred embodiment of the present invention is implemented on a general purpose computer of the types associated with conventional ultrasound imaging equipment. However, it will be apparent to those skilled in the art that other computational engines including engines with specialized hardware for computing the various statistical parameters may be used without departing from teachings of the present invention.

Various modifications to the present invention will become apparent to those skilled in the art from the foregoing description and accompanying drawings.

Accordingly, the present invention is to be limited solely by the scope of the following claims.

What is claimed is:

1. A method for enhancing an ultrasound image comprising an ordered array of pixels, each said pixel corresponding to the intensity of the echo generated by a corresponding voxel in an ultrasound energy field, said ordered array having an axial and lateral direction defined therein, said axial direction corresponding to voxels on the same radial line from a transducer used to generate said ultrasound energy field, said method comprising the steps of:

dividing said image into a plurality of processing blocks;

selecting a block based on the second order statistics of the pixels in said selected block;

for at least one pixel in said selected block, computing a mean intensity of pixels in the vicinity of said pixel;

increasing said pixel intensity if said pixel intensity is greater than said computed mean; and decreasing said pixel intensity if said pixel intensity is less than said computed mean.

2. The method of claim 1 wherein said steps of increasing and decreasing said pixel intensity comprise transforming said pixel intensity according to a sigmoidal-shaped curve having a turning point at said computed mean pixel intensity.

3. The method of claim 1 wherein said step of computing the second order statistics includes computing the mean, variance, and correlation in a variable displacement direction using a two-degree-of-freedom co-occurrence matrix for the pixels of said selected block.

4. A method for enhancing an ultrasound image comprising an ordered array of pixels, each said pixel corresponding to the intensity of the echo generated by a corresponding voxel in an ultrasound energy field, said ordered array having an axial and lateral direction, said axial direction corresponding to voxels on the same radial line from a transducer used to generate said ultrasound energy field, said method comprising the steps of:

dividing the image into a plurality of processing blocks;

selecting a block based on the second order statistics of the pixels in said selected block;

for at least one pixel in said selected block, computing a mean intensity of pixels in the vicinity of said pixel;

increasing the pixel intensity of said pixel if said pixel intensity is greater than said computed mean; and decreasing said pixel intensity if said pixel intensity is less than said computed mean, wherein the step of computing the second order statistics includes computing the mean, variance, and correlation in a variable displacement direction using a two-degree-of-freedom co-occurrence matrix for the pixels of the selected block.

5. A method for enhancing an ultrasound image comprising an ordered array of pixels, each pixel corresponding to the intensity of the echo generated by a corresponding voxel in an ultrasound energy field, the ordered array having an axial and lateral direction defined therein, the axial direction corresponding to voxels on the same radial line from a transducer used to generate said ultrasound energy field, said method comprising the steps of:

dividing the image into a plurality of processing blocks;

selecting a block based on two-degree-of-freedom, second-order statistics of the pixels in the selected block;

for at least one selected pixel in said selected block, computing a mean intensity of pixels in the vicinity of the selected pixel;

increasing the selected pixel's intensity if the selected pixel's intensity is greater than the computed mean; and decreasing said pixel intensity if said pixel intensity is less than said computed mean, wherein said step of computing the second order statistics comprises computing the mean, variance, and correlation in a variable displacement direction using sum and difference histograms for the pixels of said selected block.

6. The method of claim 1 wherein said step of selecting a block further comprising computing said second order statistics on an adjacent block in said axial direction.

7. The method of claim 1 further comprising the steps of:

defining a display threshold for each said block;

displaying those pixels in said block having amplitudes greater than said display threshold in a human perceivable form.

8. The method of claim 4 wherein said blocks are arranged in columns and rows, all of said blocks in a column corresponding to a given axial scan direction, and wherein said mean, variance, and correlation are quantized based on the range of said mean, variance, and correlation of said blocks in said column.

9. The method of claim 5 wherein said blocks are arranged in columns and rows, all of said blocks in a column corresponding to a given axial scan direction, and wherein said mean, variance, and correlation are quantized based on the range of said mean, variance, and correlation of said blocks in said column.

* * * * *